US009201768B1

(12) United States Patent
Alon et al.

(10) Patent No.: US 9,201,768 B1
(45) Date of Patent: Dec. 1, 2015

(54) SYSTEM, METHOD, AND COMPUTER PROGRAM FOR RECOMMENDING A NUMBER OF TEST CASES AND EFFORT TO ALLOCATE TO ONE OR MORE BUSINESS PROCESSES ASSOCIATED WITH A SOFTWARE TESTING PROJECT

(71) Applicant: Amdocs Software Systems Limited, Dublin (IE)

(72) Inventors: Adi Fledel Alon, Modiin-Maccabim-Reut (IL); Gilli Shama, Raanana (IL); Sagar Subhash Surana, Alpharetta, GA (US)

(73) Assignee: Amdocs Software Systems Limited, Dublin (IE)

( * ) Notice: Subject to any disclaimer, the term of this patent is extended or adjusted under 35 U.S.C. 154(b) by 0 days.

(21) Appl. No.: 14/174,797

(22) Filed: Feb. 6, 2014

(51) Int. Cl.
*G06F 9/44* (2006.01)
*G06F 11/36* (2006.01)

(52) U.S. Cl.
CPC .................................. *G06F 11/3672* (2013.01)

(58) Field of Classification Search
None
See application file for complete search history.

(56) References Cited

U.S. PATENT DOCUMENTS

| | | | | |
|---|---|---|---|---|
| 6,725,399 | B1 * | 4/2004 | Bowman ..................... | 714/38.14 |
| 6,799,314 | B2 * | 9/2004 | Beniyama et al. ............ | 717/100 |
| 2004/0117761 | A1 * | 6/2004 | Andrews et al. .............. | 717/101 |
| 2004/0205727 | A1 * | 10/2004 | Sit et al. ........................ | 717/125 |

(Continued)

FOREIGN PATENT DOCUMENTS

| | | |
|---|---|---|
| CN | 101866317 A | 10/2010 |
| EP | 2413242 A1 | 2/2012 |

OTHER PUBLICATIONS

Li, Z. et al.,"Search Algorithms for Regression Test Case Prioritization," IEEE Transactions on Software Engineering, vol. 33, No. 4, Apr. 2007, pp. 225-237.

*Primary Examiner* — James D Rutten
(74) *Attorney, Agent, or Firm* — Zilka-Kotab, PC

(57) ABSTRACT

A system, method, and computer program product are provided for recommending a number of test cases and effort to allocate to one or more business processes associated with a software testing project. In use, one or more business processes associated with a software testing project are identified. A business priority and customization level is set for each of the one or more business processes associated with the software testing project Additionally, a number of defects are estimated for each of the one or more business processes associated with the software testing project. Further, a quality level is determined for each of the one or more business processes associated with the User Acceptance Testing software testing project. In addition, a number of test cases to be executed to achieve the quality level is determined for each of the one or more business processes associated with the software testing project, the number of test cases to be executed to achieve the desired quality level being based, at least in part, on the estimated number of defects and the business priority. Furthermore, an effort analysis associated with one or more past software testing projects is identified. Moreover, an estimated effort is determined for each of the one or more business processes associated with the software testing project, the estimated effort being based, at least in part, on the number of test cases to be executed to achieve the quality level, the business priority, and the effort analysis of the one or more past software testing projects. Still yet, the estimated effort is displayed for at least one of the one or more business processes associated with the software testing project utilizing at least one interface.

20 Claims, 6 Drawing Sheets

(56) References Cited

U.S. PATENT DOCUMENTS

2006/0041864 A1* 2/2006 Holloway et al. ............. 717/124
2007/0174702 A1 7/2007 Meyer
2011/0016447 A1* 1/2011 Goel et al. ................... 717/101
2011/0066420 A1* 3/2011 Bassin et al. ................. 703/22
2012/0030651 A1 2/2012 Kemmler et al.
2012/0266023 A1* 10/2012 Brown et al. ................. 714/32
2013/0090911 A1 4/2013 Segall et al.

* cited by examiner

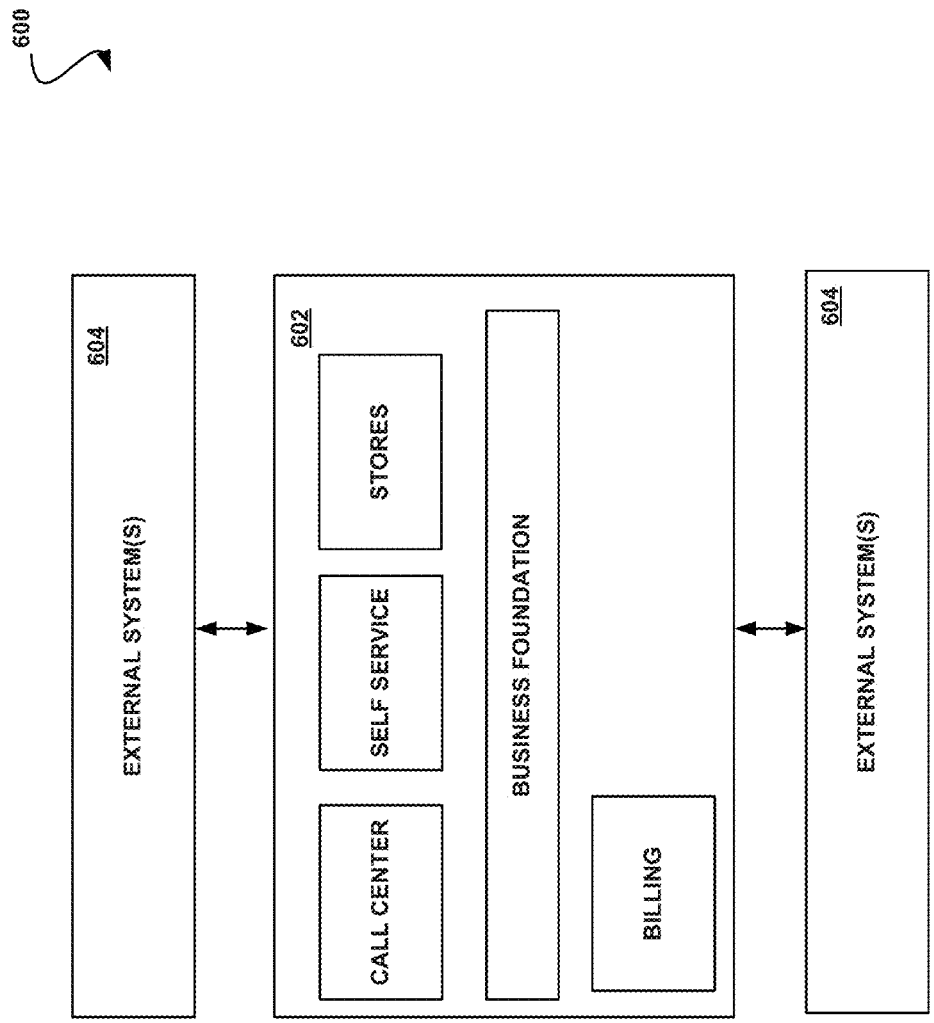

SYSTEM, METHOD, AND COMPUTER PROGRAM FOR RECOMMENDING A NUMBER OF TEST CASES AND EFFORT TO ALLOCATE TO ONE OR MORE BUSINESS PROCESSES ASSOCIATED WITH A SOFTWARE TESTING PROJECT

FIELD OF THE INVENTION

The present invention relates to software development projects, and more particularly to generating and employing efficient and effective test plans for testing software associated with such software development projects.

BACKGROUND

The testing of software is a critical step in the software development lifecycle. The objective of the testing is to verify and validate the integration of the software, the hardware and the configuration thereof, and to prevent malfunction of the software when in use.

User Acceptance Testing (UAT), also called beta testing, and/or end user testing, is a phase of software development in which the software is tested in the "real world" (e.g. at a customer premises) by an intended audience or a business representative. The goal of User Acceptance Testing is to assess whether a system can support day-to-day business and user scenarios and ensure the system is sufficient and correct for business usage.

UAT tests are created to verify the system's behavior is consistent with the requirements. These tests will reveal defects within the system. The work associated with User Acceptance Testing begins after requirements are written and continues through the final stage of testing before the client accepts the new system.

A crucial step to avoiding inefficiencies in User Acceptance Testing is to employ an efficient and effective test plan. However, currently, there is not a technique available to efficiently generate effective test plans, while still performing an effective risk assessment for determining schedules and effort levels associated with such testing projects.

There is thus a need for addressing these and/or other issues associated with the prior art.

SUMMARY

A system, method, and computer program product are provided for recommending a number of test cases and effort to allocate to one or more business processes associated with a software testing project. In use, one or more business processes associated with a software testing project are identified. A business priority and customization level is set for each of the one or more business processes associated with the software testing project Additionally, a number of defects are estimated for each of the one or more business processes associated with the software testing project. Further, a quality level is determined for each of the one or more business processes associated with the software testing project. In addition, a number of test cases to be executed to achieve the quality level is determined for each of the one or more business processes associated with the software testing project, the number of test cases to be executed to achieve the desired quality level being based, at least in part, on the estimated number of defects and the business priority. Furthermore, an effort analysis associated with one or more past software testing projects is identified. Moreover, an estimated effort is determined for each of the one or more business processes associated with the software testing project, the estimated effort being based, at least in part, on the number of test cases to be executed to achieve the quality level, the business priority, and the effort analysis of the one or more past software testing projects. Still yet, the estimated effort is displayed for at least one of the one or more business processes associated with the software testing project utilizing at least one interface.

BRIEF DESCRIPTION OF THE DRAWINGS

FIG. 6 illustrates a Business Support System (BSS) architectural diagram, in accordance with one embodiment.

DETAILED DESCRIPTION

Figure 1:
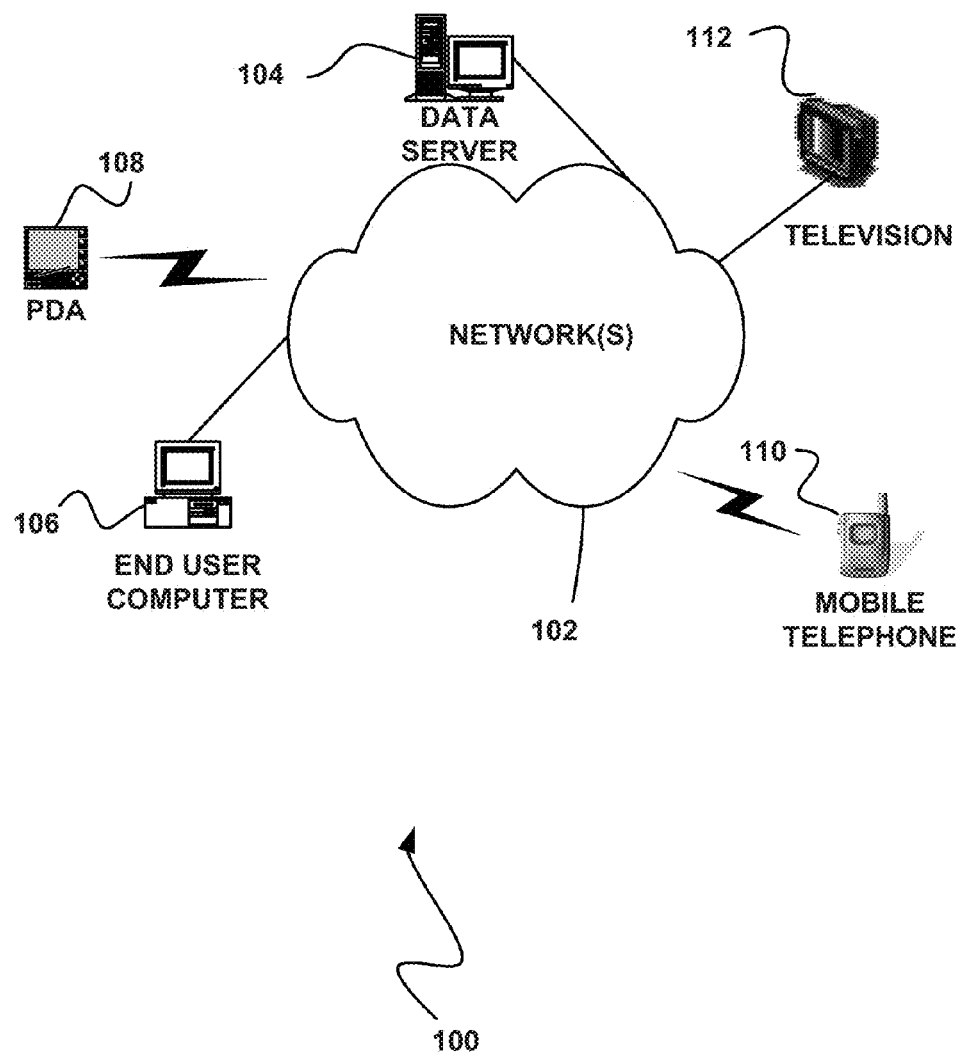
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
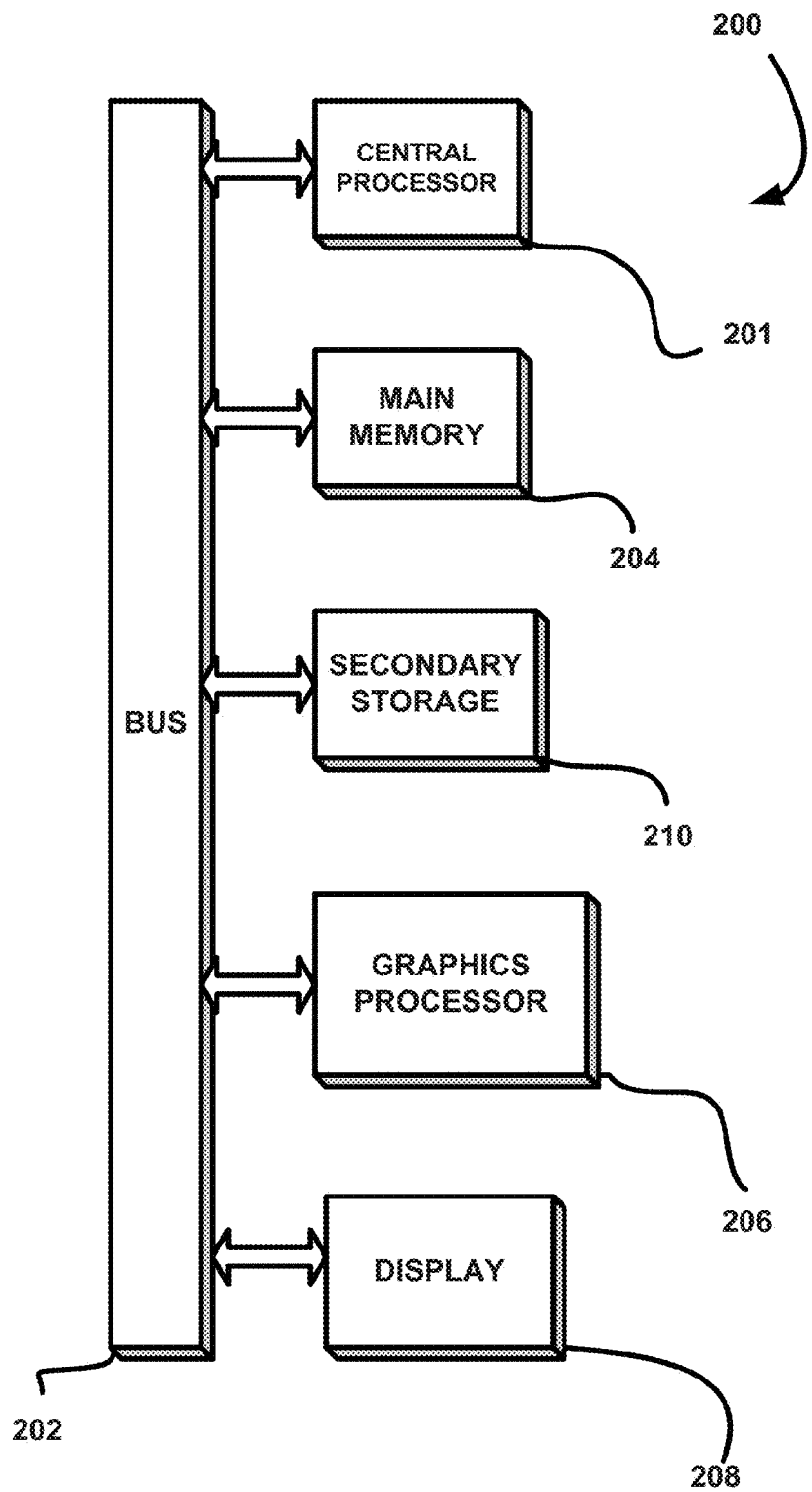
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
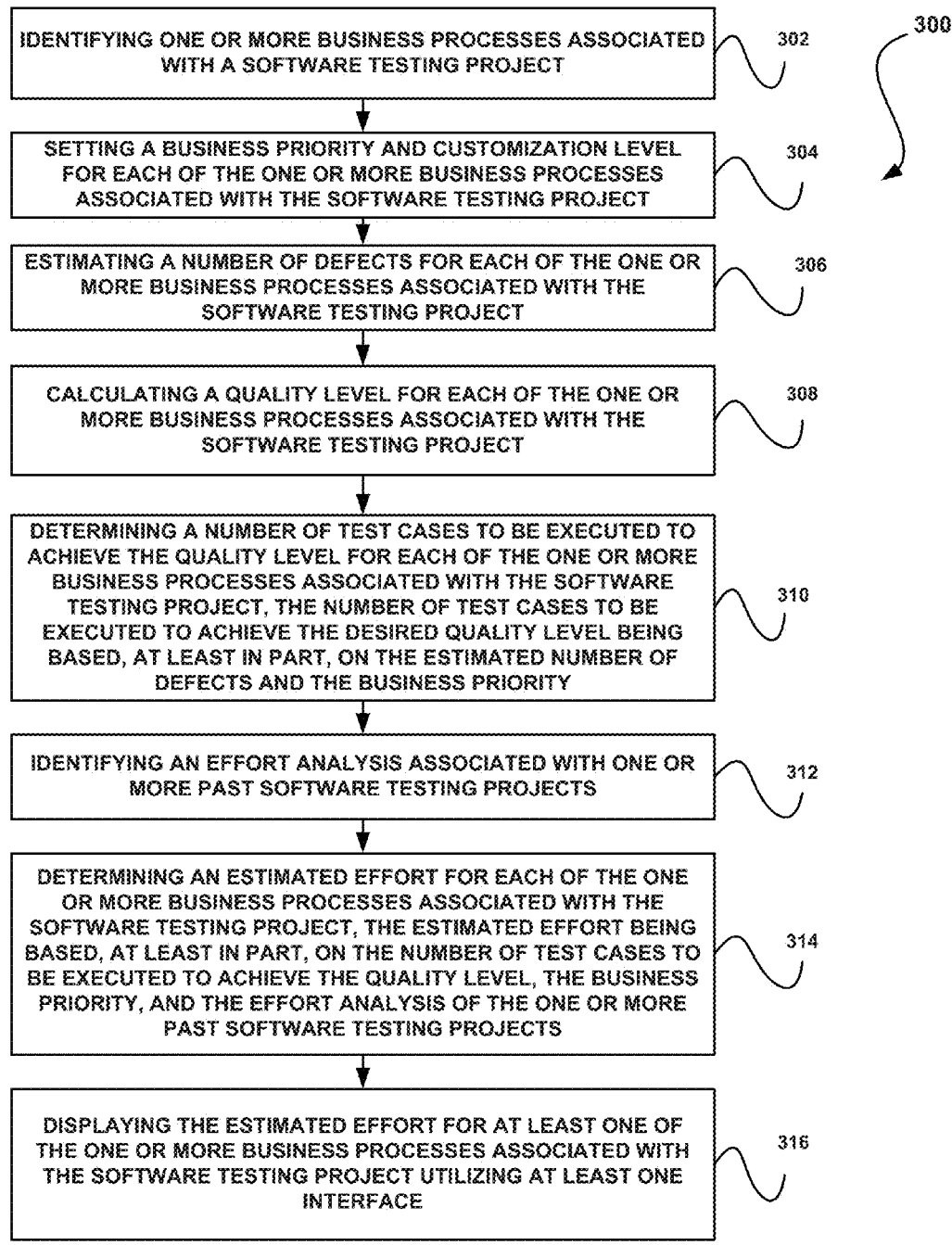
FIG. 3 illustrates a method for recommending a number of test cases and effort to allocate to one or more business processes associated with a software testing project, in accordance with one embodiment.

FIG. 3 illustrates a method 300 for recommending a number of test cases and effort to allocate to one or more business processes associated with a software testing project, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, one or more business processes associated with a software testing project are identified. See operation 302. The software testing project may include any project associated with testing any type of software. For example, in one embodiment, the software testing project may be associated with telecommunications service provider-related software.

In one embodiment, the software testing project may be associated with User Acceptance Testing. User Acceptance Testing refers to a phase of software development in which the software is tested in the "real world" (e.g. at a customer premises) by an intended audience or a business representative. The goal of User Acceptance Testing is to assess whether a system can support day-to-day business and user scenarios and ensure the system is sufficient and correct for business usage. User Acceptance Testing functions to test the software itself, as well as the interaction of the software with other (e.g. external) software and/or components (e.g. customer software and/components, etc.).

In various other embodiments, the software testing project may be associated with any other type of testing, such as Sub System Testing, System Testing, Interface Integration Testing/System Integration Testing, E2E Testing, and/or Non-Functional Testing, etc.

Further, the business processes may include any process, step, and/or technique associated with the software testing project. In one embodiment, the business processes may include a business process associated with a business process framework. For example, in one embodiment, the business processes may be associated with the Enhanced Telecom Operations Map (eTOM). In this case, the eTOM may be utilized to describe a scope of business processes required by a service provider and may be used to define key elements and how they interact.

The business processes may be identified in a variety of ways. For example, in one embodiment, the business processes may be selected (e.g. automatically, by a user, etc.). In another embodiment, the business processes may be defined (e.g. automatically, by a user, etc.).

As shown further in FIG. 3, a business priority and customization level is set for each of the one or more business processes associated with the software testing project. See operation 304. The priority may include various indicators of priority including an indication of a low priority, an indication of a medium priority, an indication of a high priority, and an indication of a critical priority, etc.

Additionally, a number of defects are estimated for each of the one or more business processes associated with the software testing project. See operation 306. The defects may include any anomaly, problem, concern, business requirement related issue, and/or other any other issue indicative of a defect.

In one embodiment, the number of defects for each of the business processes associated with the software testing project may be estimated utilizing a fault prediction algorithm. Further, in one embodiment, the number of defects for the business processes associated with the software testing project may be based on, or estimated utilizing, defect information associated with one or more past software testing projects and/or past business processes associated therewith.

The defect information associated with the past software testing projects and/or past business processes may include any information associated with the defect. For example, in one embodiment, the defect information associated with the past software testing projects and/or the past business processes may include a severity associated with each defect. In this case, the severity may be a user defined severity or a severity determined automatically. In various embodiments, the defects may be associated with a severity level including a critical level, a high level, a medium level, or a low level, etc.

Furthermore, in one embodiment, the number of defects for the business processes associated with the software testing project may be based on, or estimated utilizing, metadata associated with the one or more past software testing projects. In various embodiments, the metadata associated with the one or more past software testing projects may include a project type, a product, a service level agreement for defect removal efficiency, a line of business, a geographic region, and/or a development effort, etc.

Still yet, in one embodiment, the number of defects for each of the one or more business processes associated with the software testing project may be estimated based, at least in part, on a level of software customization associated with the software testing project. In various embodiments, the level of software customization may be input manually or calculated from activities driven by business requirements.

As shown further in FIG. 3, a quality level is determined for each of the one or more business processes associated with the software testing project. See operation 308. In one embodiment, the quality level may be determined based on a business priority of the particular business process.

For example, in one embodiment, identifying the one or more business processes associated with the software testing project may include selecting the business processes and setting a business priority for each of the business processes. As an option, the business priority for each of the business processes may be set based on a service level agreement associated with the software testing project.

In various embodiments, the business priority may be manually set or automatically set. In either case, the quality level for each of the one or more business processes associated with the software testing project may be calculated based, at least in part, on the business priority for each of the one or more business processes.

In one embodiment, the quality level may include a percentage of targeted defects to remove. For example, this may be based on the service level agreement and the business priority associated with the business process.

With further reference to FIG. 3, a number of test cases to be executed to achieve the quality level is determined for each of the one or more business processes associated with the software testing project, the number of test cases to be executed to achieve the desired quality level being based, at least in part, on the estimated number of defects. See operation 310.

In one embodiment, in order to reduce risk and maximize a number of defects discovered in testing, the number of test cases to be executed for each business process may be selected in a manner that allocates more effort to a business process with the highest combination of business importance (e.g. based on an allocated priority, etc.) and probability of failure (e.g. based on estimated defects, etc.) first.

Further, in one embodiment, determining the number of test cases to be executed to achieve the quality level for each of the business processes associated with the software testing project may include calculating the number of test cases to be executed from an S-curve function that links a number of discovered defects associated with the one or more past software testing projects to a number of test cases associated with the one or more past software testing projects. For example, the S-curve function may link the number of past defects to the number of past test cases, and the S-curve function may be traced back to determine the number of test cases needed to achieve the target quality for a particular business process.

As shown further in FIG. 3, an effort analysis associated with one or more past software testing projects is identified. See operation 312. In various embodiments, the effort analysis may be calculated and/or identified from a database (or repository, etc.) associated with historical test data/projects.

Furthermore, an estimated effort is determined for each of the one or more business processes associated with the software testing project. See operation 314. The estimated effort is based, at least in part, on the number of test cases to be executed to achieve the quality level, the business priority, and the effort analysis of the one or more past software testing projects. The estimated effort refers to the amount of effort estimated to perform the business process.

In one embodiment, the estimated effort may be a fraction or a percentage of an overall project effort. In this case, the sum of the estimated effort for all of the business processes associated with the software testing project may total 100%.

Still yet, the estimated effort is displayed for at least one of the one or more business processes associated with the software testing project utilizing at least one interface. See operation 316. In one embodiment, the estimated effort may be displayed in a graph or chart (e.g. a pie chart, etc.). Additionally, the estimated effort may be displayed as a number.

In one embodiment, the method 300 may further include generating a test management recommendation associated with the software testing project or a business process, based on the estimated number of defects for each of the business processes and the quality level for each of the business processes. For example, in one embodiment, the test management recommendation associated with the software testing project may include a recommendation associated with testing personnel. Further, in one embodiment, the test management recommendation may be displayed utilizing the at least one interface.

Various items may also be displayed utilizing the interface (or another interface). For example, the interface may display one or more of the determined number of test cases to be executed as a recommended number of test cases to be executed. Additionally, the interface may display the estimated effort as a recommended amount of effort to allocate to each of the one or more business processes associated with the software testing project.

Still yet, in one embodiment, the method 300 may include generating at least one test calendar for each of the one or more business processes, the test calendar indicating at least the number of test cases to be executed to achieve the quality level for each of the one or more business processes associated with the software testing project. A test calendar is a set of testing flows. Further, a testing flow is a set of test cases aligned in particular order to represent a flow in a system. Each calendar may be associated with a single business process.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
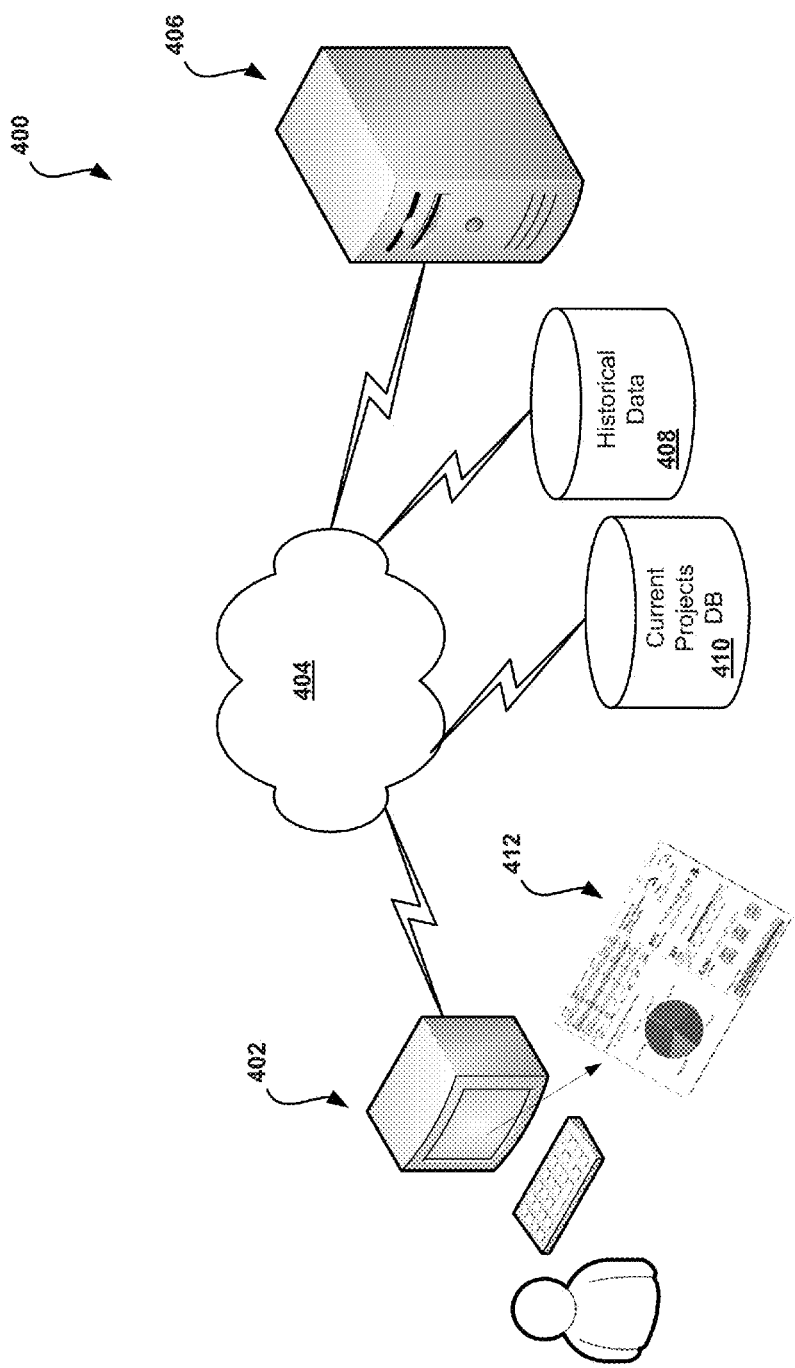
FIG. 4 illustrates a system for recommending a number of test cases and effort to allocate to one or more business processes associated with a software testing project, in accordance with one embodiment.

FIG. 4 illustrates a system 400 for recommending a number of test cases and effort to allocate to one or more business processes associated with a software testing project, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

As shown, the system 400 includes one or more user devices 402 that are in communication with one or more databases 408 and 410, and/or one or more servers 406 over a network 404. The system 400 may represent a User Acceptance Testing system at a customer premises, allowing a customer to perform User Acceptance Testing. Of course, the system 400 may represent any other type of testing system.

In operation, the system 400 may function to employ a new methodology and tool for high level design of a User Acceptance Testing software testing project that recommends a number of test cases (TCs) and an amount of effort to allocate to each business process (BP) covered in the User Acceptance Testing software testing project. In one embodiment, this methodology may include a business process oriented methodology that uses risk-based testing (RBT), where the risk-based testing combines a statistical algorithm of fault prediction together with human-based risk assessment.

In one embodiment, the fault prediction algorithm may be based on analytics of concurrent project data combined with similar projects' history data. This tool may function to reduce test design time and effort for software testing projects. Additionally, this tool may be utilized to assist test designers in achieving better test design with respect to execution time and effort, while maintaining high quality.

Thus, the system 400 may employ a risk based methodology for efficient and effective test plan design via analytics of ongoing projects data (e.g. stored in a current projects database 410, etc.) and similar projects history data (e.g. stored in a database including historical data 408, etc.). Risk assessment is a best practice for determining schedules and effort levels.

The basic component for this high level test design is a business process (e.g. eTOM standard business processes for service providers, etc.). In the context of the present description, a test calendar refers to a set of testing flows. A testing flow is a set of test cases aligned in particular order to represent a flow in the system. Each calendar may belong to a single business process or may include several business processes exclusively.

As a basis for all analysis, the project's metadata (e.g. project type, products, service level agreement for defect removal efficiency, line of business, geographic region, and testing and development effort, etc.) must be defined. Additionally, the relevant business process should be chosen and a priority may be set respectively.

In order to reduce the risk and maximize the number of defects that are discovered, the number of test cases that are run for each business process should be selected in order to allocate effort to the business process with the highest combination of business importance and probability of failure first.

To accomplish this, a fault prediction algorithm may estimate the number of defects per business process using: previous projects' data of defects, per business process and their severity; previous projects' meta-data; and/or level of software customization (e.g. which may be input manually or calculated from activities driven by business requirements, etc.). In various embodiments, this information may be stored in the databases 408 and 410, on the server(s) 406, on the user device 402, and/or in another location.

Further, a quality level is derived for each business process as a function of the business process priority, thus using the service level agreement as a constant for the entire project. In various embodiments, this service level agreement may be stored in the databases 408 and 410, on the server(s) 406, on the user device 402, and/or in another location.

Next, the algorithm recommends the number of test cases per business process to be executed in order to achieve the predetermined quality. In one embodiment, this may be calculated from an S-curve function that links the number of discovered defects to the number of test cases, and traces back from this function the number of test cases for target quality.

The recommended number of test cases may be presented to a test designer utilizing the user device 402 via a user interface 412. More details associated with one embodiment of the user interface 412 are described in the context of FIG. 5.

For each combination of risk based testing (e.g. quality and predicted defects, etc.), a default test management recommendation may be displayed to a user (e.g. utilizing the interface 412, etc.). Finally, the effort is estimated for each business process using the number of test cases and effort analysis of past projects (e.g. based on ratios in test case handling duration, etc.), leading to a calendar assignment. Furthermore, this estimated effort may be presented to the user of the device 402 via the interface 412.

Figure 5:
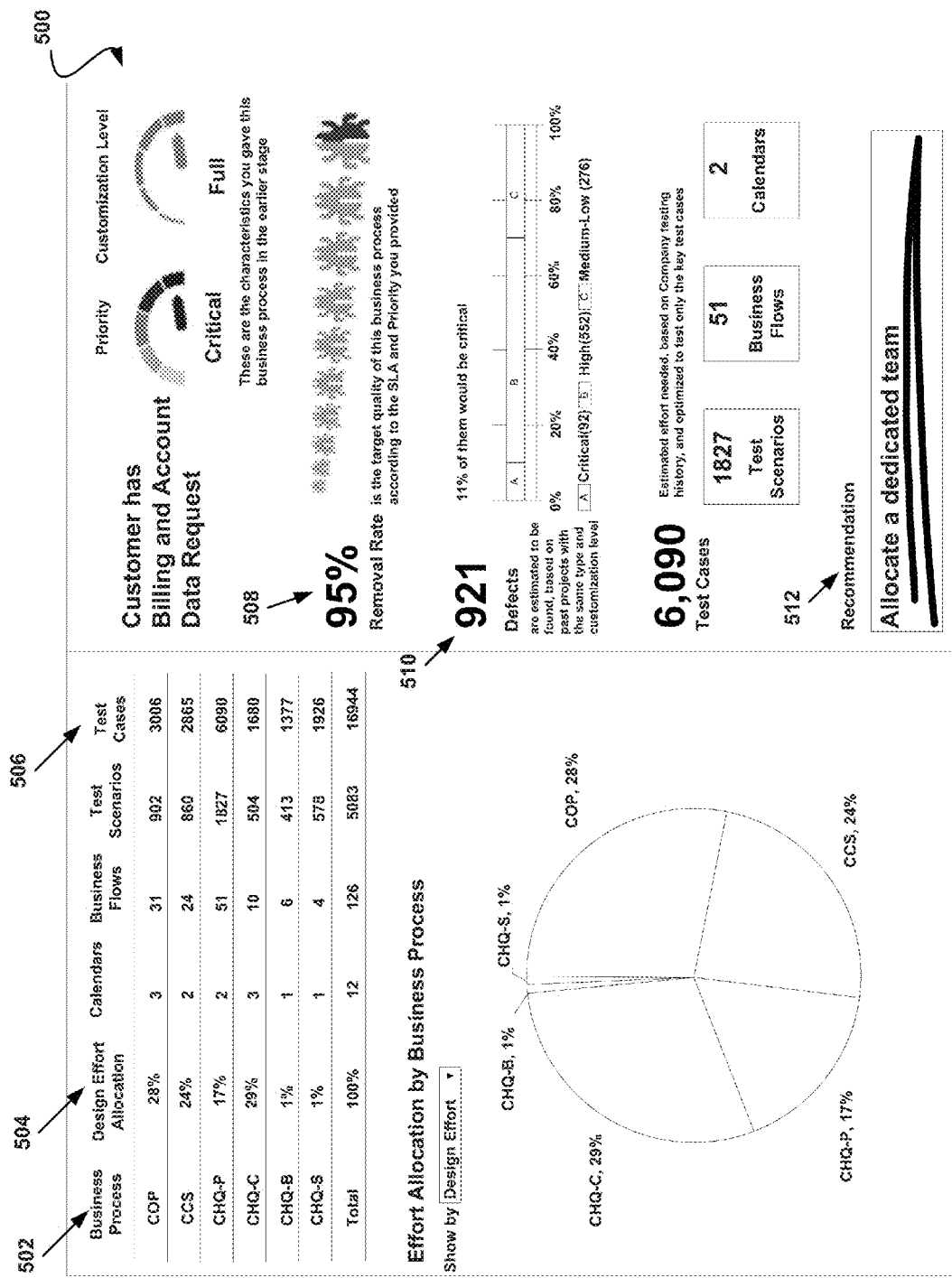
FIG. 5 illustrates an interface for recommending a number of test cases and effort to allocate to one or more business processes associated with a software testing project, in accordance with one embodiment.

FIG. 5 illustrates an interface 500 for recommending a number of test cases and effort to allocate to one or more business processes associated with a software testing project, in accordance with one embodiment. As an option, the interface 500 may be implemented in the context of the details of FIGS. 1-4. Of course, however, the interface 500 may be implemented in the context of any desired environment. Further, the aforementioned definitions may equally apply to the description below.

As shown, the interface 500 shows information and analysis associated with a plurality of business processes 502, including a design test effort allocation 504 and a recommended number of test cases 506. Additionally, the interface 500 shows a target quality 508 for a selected business process.

In this case, the target quality 508 includes a target defect removal rate. Furthermore, the target quality 508 is based on the service level agreement and priority for the business process.

In addition, the interface 500 shows an estimated number of defects 510 that are expected to be found based on past projects with a same type and customization level. The interface 500 also shows a percentage of the defects that are estimated to be of critical importance, high importance, and medium to low importance. As shown further, the interface 500 may present a test management recommendation 512 associated with the software testing project and/or the specific business process.

In one embodiment, a user may select to see analysis of a specific business process (e.g. shown in the right half of the interface 500) by selecting the specific business process from the left of the interface 500. In various embodiments, the interface 500 may include various information and/or functionality.

The interface 500 may be generated utilizing a system that employs a statistical algorithm of fault localization with human-based risk assessment. This system may eliminate the areas to be tested and optimize effort in the context of User Acceptance Testing, when the development has ended, based on business priority and criticality, and level of customization.

FIG. 6 illustrates a Business Support System (BSS) architectural diagram 600, in accordance with one embodiment. As an option, the BSS architectural diagram 600 may be implemented in the context of the details of FIGS. 1-5. Of course, however, the BSS architectural diagram 600 may be implemented in the context of any desired environment. Further, the aforementioned definitions may equally apply to the description below.

As shown, a system 602 may interface with various external systems 604 at a customer site, etc., during User Acceptance Testing. In this case, functionality associated with the system 602 may be tested during User Acceptance Testing. Additionally, the User Acceptance Testing may include testing and verifying that functionality associated with the system 602 operates correctly and as expected with functionality associated with the various external systems 604. The User Acceptance Testing functions to test the software itself, as well as the interaction of the software with other software and/or components (e.g. customer software and/components, third party software/components, etc.).

As shown, in one embodiment, the system 602 may include call center functionality and/or components. In various embodiments, such call center functionality may include, for example, customer interaction functionality, billing manager functionality, sales functionality, ordering functionality, support functionality, marketing functionality, service level agreement information, analytics functionality, and/or various other functionality/components.

Additionally, the system 602 may include billing functionality and/or components. In various embodiments, such billing functionality may include rating functionality, invoicing functionality, resource management functionality, collections functionality, account management functionality, and/or various other functionality/components.

Further, in one embodiment, the system 602 may include self service or dealer functionality. Such functionality may include billing components, support components, and/or other components/functionality. Additionally, in one embodiment, a store component may be included in the system 602. The store component may include a customer interaction manager component, etc.

The system 602 may also include foundational components, such as a process manager, an error manager, a configuration manager, a security manager, and/or various other components. During User Acceptance Testing, any or all of this functionality associated with the system 602 may be tested.

Moreover, such functionality may be tested to verify correct operation with components of the external systems 604, which may include network components, legacy rating system components, IVR system components, print shop components, exchange system components, billing components (e.g. direct debit components, credit card components, etc.), communication components (e.g. email, SMS messages, etc.), finance components, external storefront components, and/or various other components/functionality. Of course, the systems 602 and 604 may include any type and/or number of components, in various embodiments, which may or may not be tested during User Acceptance Testing.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for identifying one or more business processes associated with a software testing project;
   computer code for setting a business priority and customization level for each of the one or more business processes associated with the software testing project, the business priority including a priority level assigned to each of the one or more business processes, and the customization level including a magnitude of customization for each of the one or more business processes;
   computer code for estimating a number of defects for each of the one or more business processes associated with the software testing project;
   computer code for calculating a quality level for each of the one or more business processes associated with the software testing project as a function of the business priority for each of the one or more business processes, where for each of the one or more business processes the quality level includes a percentage of targeted defects to be removed from the business process;
   computer code for determining a number of test cases to be executed to achieve the quality level for each of the one or more business processes associated with the software testing project, the number of test cases to be executed to achieve the desired quality level being based, at least in part, on the estimated number of defects and the business priority;
   computer code for identifying an effort analysis associated with one or more past software testing projects;
   computer code for determining an estimated effort for each of the one or more business processes associated with the software testing project, the estimated effort being based, at least in part, on the number of test cases to be executed to achieve the quality level, the business priority, and the effort analysis of the one or more past software testing projects; and
   computer code for displaying the estimated effort for at least one of the one or more business processes associated with the software testing project utilizing at least one interface.

2. The computer program product of claim 1, further comprising computer code for generating a test management recommendation associated with the software testing project based on the estimated number of defects for each of the one or more business processes and the quality level for each of the one or more business processes.

3. The computer program product of claim 2, wherein the computer program product is operable such that the test management recommendation associated with the software testing project includes a recommendation associated with testing personnel.

4. The computer program product of claim 2, further comprising computer code for displaying the test management recommendation utilizing the at least one interface.

5. The computer program product of claim 1, further comprising computer code for displaying one or more of the determined number of test cases to be executed as a recommended number of test cases to be executed.

6. The computer program product of claim 1, wherein the computer program product is operable such that displaying the estimated effort for the at least one of the one or more business processes associated with the software testing project utilizing the at least one interface includes displaying the estimated effort as a recommended amount of effort to allocate to each of the one or more business processes associated with the software testing project.

7. The computer program product of claim 1, wherein the computer program product is operable such that identifying the one or more business processes associated with the software testing project includes selecting the one or more business processes and setting the business priority for each of the one or more business processes.

8. The computer program product of claim 7, wherein the computer program product is operable such that the business priority for each of the one or more business processes is set based on a service level agreement associated with the software testing project.

9. The computer program product of claim 8, wherein the computer program product is operable such that the quality level for each of the one or more business processes associated with the software testing project is calculated based on the estimated number of defects and the business priority for each of the one or more business processes.

10. The computer program product of claim 1, wherein the computer program product is operable such that the number of defects for each of the one or more business processes associated with the software testing project is estimated utilizing a fault prediction algorithm.

11. The computer program product of claim 1, wherein the computer program product is operable such that the number of defects for each of the one or more business processes associated with the software testing project is estimated utilizing defect information associated with the one or more past software testing projects.

12. The computer program product of claim 11, wherein the computer program product is operable such that the defect information associated with the one or more past software testing projects includes a severity associated with each defect associated with the one or more past software testing projects.

13. The computer program product of claim 1, wherein the computer program product is operable such that the number of defects for each of the one or more business processes associated with the software testing project is estimated utilizing metadata associated with the one or more past software testing projects.

14. The computer program product of claim 13, wherein the computer program product is operable such that the metadata associated with the one or more past software testing projects includes at least one of a project type, a product, a service level agreement for defect removal efficiency, a line of business, a geographic region, or a testing and development effort.

15. The computer program product of claim 1, wherein the computer program product is operable such that the number of defects for each of the one or more business processes associated with the software testing project is estimated based, at least in part, on the customization level associated with the software testing project.

16. The computer program product of claim 1, wherein the computer program product is operable such that determining the number of test cases to be executed to achieve the quality level for each of the one or more business processes associated with the software testing project includes calculating the number of test cases to be executed from an S-curve function that links a number of discovered defects associated with the one or more past software testing projects to a number of test cases associated with the one or more past software testing projects.

17. The computer program product of claim 16, wherein the computer program product is operable such that determining the number of test cases to be executed to achieve the quality level for each of the one or more business processes associated with the software testing project further includes tracing back the S-curve function utilizing the number of test cases associated with the one or more past software testing projects to determine the number of test cases to be executed to achieve the quality level.

18. The computer program product of claim 1, further comprising computer code for generating at least one test calendar for each of the one or more business processes, the at least one test calendar indicating at least the number of test cases to be executed to achieve the quality level for each of the one or more business processes associated with the software testing project.

19. A method, comprising:
identifying one or more business processes associated with a software testing project;
setting a business priority and customization level for each of the one or more business processes associated with the software testing project, utilizing a hardware processor, the business priority including a priority level assigned to each of the one or more business processes, and the customization level including a magnitude of customization for each of the one or more business processes;
estimating a number of defects for each of the one or more business processes associated with the software testing project;
calculating a quality level for each of the one or more business processes associated with the software testing project as a function of the business priority for each of the one or more business processes, where for each of the one or more business processes the quality level includes a percentage of targeted defects to be removed from the business process;
determining a number of test cases to be executed to achieve the quality level for each of the one or more business processes associated with the software testing project, the number of test cases to be executed to achieve the desired quality level being based, at least in part, on the estimated number of defects and the business priority;

identifying an effort analysis associated with one or more past software testing projects;
determining an estimated effort for each of the one or more business processes associated with the software testing project, the estimated effort being based, at least in part, on the number of test cases to be executed to achieve the quality level, the business priority, and the effort analysis of the one or more past software testing projects; and
displaying the estimated effort for at least one of the one or more business processes associated with the software testing project utilizing at least one interface.

20. A system comprising:
a memory system; and
one or more processing cores coupled to the memory system and that are each configured to:
identify one or more business processes associated with a software testing project;
set a business priority and customization level for each of the one or more business processes associated with the software testing project, the business priority including a priority level assigned to each of the one or more business processes, and the customization level including a magnitude of customization for each of the one or more business processes;
estimate a number of defects for each of the one or more business processes associated with the software testing project;
calculate a quality level for each of the one or more business processes associated with the software testing project as a function of the business priority for each of the one or more business processes, where for each of the one or more business processes the quality level includes a percentage of targeted defects to be removed from the business process;
determine a number of test cases to be executed to achieve the quality level for each of the one or more business processes associated with the software testing project, the number of test cases to be executed to achieve the desired quality level being based, at least in part, on the estimated number of defects and the business priority;
identify an effort analysis associated with one or more past software testing projects;
determine an estimated effort for each of the one or more business processes associated with the software testing project, the estimated effort being based, at least in part, on the number of test cases to be executed to achieve the quality level, the business priority, and the effort analysis of the one or more past software testing projects; and
display the estimated effort for at least one of the one or more business processes associated with the software testing project utilizing at least one interface.

* * * * *

UNITED STATES PATENT AND TRADEMARK OFFICE
CERTIFICATE OF CORRECTION

PATENT NO. : 9,201,768 B1
APPLICATION NO. : 14/174797
DATED : December 1, 2015
INVENTOR(S) : Adi Fledel Alon et al.

It is certified that error appears in the above-identified patent and that said Letters Patent is hereby corrected as shown below:

On the title page
    Item (73) Assignee; please replace "Amdoes Software Systems Limited" with --Amdocs Software Systems Limited--.

Signed and Sealed this
Twelfth Day of April, 2016

Michelle K. Lee
*Director of the United States Patent and Trademark Office*